United States Patent [19]
Butrie et al.

[11] Patent Number: 5,796,899
[45] Date of Patent: Aug. 18, 1998

[54] BIDIRECTIONAL OPTICAL TRANSCEIVER ASSEMBLY WITH REDUCED CROSSTALK

[75] Inventors: Timothy Butrie, Orefield, Pa.;
Shigemasa Enoeda, Okaya, Japan;
Joseph Edward Riska, Macungie, Pa.;
Stephen James Salko, Weatherly, Pa.;
Thomas Stanley Stakelon, Allentown, Pa.; Alka Swanson, San Diego, Calif.;
Toshimichi Yasuda, Okaya, Japan

[73] Assignee: Lucent Technologies Inc., Murray Hill, N.J.

[21] Appl. No.: 755,635

[22] Filed: Nov. 25, 1996

Related U.S. Application Data

[60] Provisional application No. 60/012,113, Dec. 28, 1995.
[51] Int. Cl.[6] .................................................. G02B 6/36
[52] U.S. Cl. .................................................. 385/92; 385/93

[58] Field of Search .................................. 385/92, 88–94

[56] References Cited

U.S. PATENT DOCUMENTS

| 5,127,075 | 6/1992 | Althaus et al. | 385/92 X |
| 5,347,605 | 9/1994 | Isaksson | 385/92 |
| 5,408,559 | 4/1995 | Takahashi et al. | 385/89 |

*Primary Examiner*—Phan T. H. Palmer
*Attorney, Agent, or Firm*—Michael J. Urbano

[57] ABSTRACT

An optical transceiver assembly for use in a bidirectional system includes a beam splitter to direct an incoming signal to a photodiode. An outgoing signal from a laser diode is partially transmitted and partially reflected by the splitter. The reflected signal, which may reach the photodiode, constitutes crosstalk which is reduced by means of a cavity positioned to receive the reflected signal and an oblique surface within the cavity adapted to prevent much of the reflected signal from reaching the photodiode.

2 Claims, 1 Drawing Sheet

BIDIRECTIONAL OPTICAL TRANSCEIVER ASSEMBLY WITH REDUCED CROSSTALK

CROSS-REFERENCE TO RELATED APPLICATION

This application claims priority of Provisional Application Ser. No. 60/012,113 which was filed on Dec. 28, 1995.

BACKGROUND OF THE INVENTION

This invention relates to bidirectional fiber optic communication systems and, more particularly, to a transceiver assembly with reduced crosstalk for use in such systems.

In a typical bidirectional fiber optic communication system, such as a fiber-in-the-loop (FITL) system, optical signals propagate in both directions over a single optical fiber. Terminal equipment at each end of the fiber includes a transceiver which launches an outgoing signal onto the fiber and which receives an incoming signal from the same fiber. The outgoing and incoming signals may have the same wavelength or different wavelengths. Generally, within the transceiver assembly the outgoing and incoming signals are directed over separate optical paths between the fiber and either a light source (e.g., a laser diode) and a light detector (e.g., a photodiode). Most designs incorporate a beam splitter which partially transmits the outgoing signal from the laser diode to an output fiber (e.g., a fiber pigtail) and partially reflects the incoming signal to the photodiode. The remaining portion of the outgoing signal is also reflected by the beam splitter to incidence upon various surfaces internal to the assembly. These surfaces further reflect or scatter the signal. (For simplicity, we will refer to these as "reflections".) Some of the reflections of the outgoing signal reach the photodiode and constitute crosstalk when the system is operated in a full duplex mode. That is, the photodiode is intended to detect only the incoming signal, not reflected portions of the outgoing signal. To the extent that the latter is detected, it constitutes noise or crosstalk. A need remains in the art for reducing such crosstalk.

SUMMARY OF THE INVENTION

A transceiver assembly for use in bidirectional communications systems is designed to reduce crosstalk by incorporating, adjacent the beam splitter, a cavity and an oblique surface within the cavity. Most of the outgoing signal which is reflected by the splitter is incident on the oblique surface and thereby prevented from reaching the photodetector.

In a preferred embodiment, the cavity is cylindrical and aligned along the axis between the photodetector and the splitter. In this embodiment the oblique surface is provided by a plug positioned within the cavity.

BRIEF DESCRIPTION OF THE DRAWINGS

The invention, together with its various features and advantages, can be readily understood from the following more detailed description taken in conjunction with accompanying drawing, in which.

DETAILED DESCRIPTION

Figure 1:
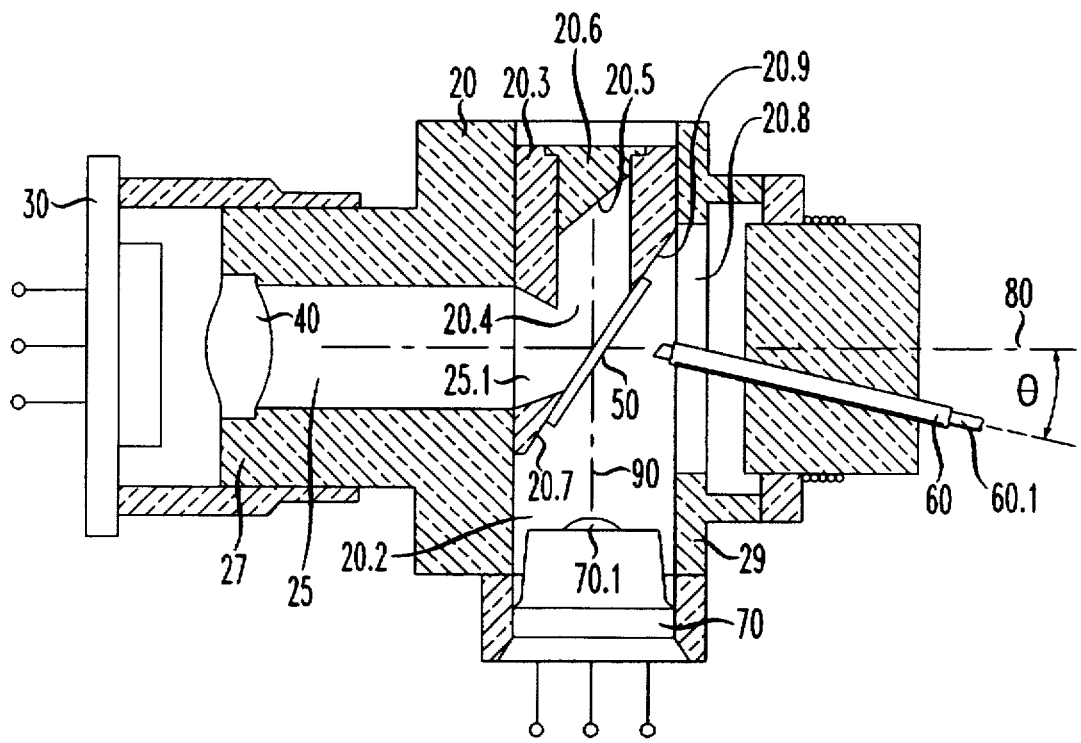
FIG. 1 is a somewhat schematic, partial cross-sectional view of a transceiver assembly in accordance with one embodiment of the invention.

A transceiver assembly 10 in accordance with an illustrative embodiment of the invention comprises a housing 20 in which several components are mounted: a light source, such as a laser diode package 30, for launching an outgoing optical signal; lens means 40 for focusing the outgoing signal through a beam splitter 50 into an optical fiber, such as a fiber pigtail 60; and a photodetector, such as a photodiode package 70, for detecting an incoming optical signal emanating from the fiber and reflected by the beam splitter 50. A lens 70.1 focuses the incoming signal onto a photodiode (not shown) located within package 70.

The housing includes a bore 25 which provides an optical communication path between the laser package 30 and the beam splitter 50. The end 25.1 of the bore adjacent the beam splitter has a conical shape. The laser package is mounted in a left peripheral section 27 of the housing, whereas the photodetector package 70 and beam splitter 50 are mounted in a central section 20.2. Splitter 50 is typically mounted at a 45° angle to the transmission axis 80. An aperture 20.8 located in a right peripheral section 29 allows the fiber 60 to be positioned to receive the outgoing signal propagating through splitter 50 and to direct the incoming signal onto the splitter.

Figure 2:
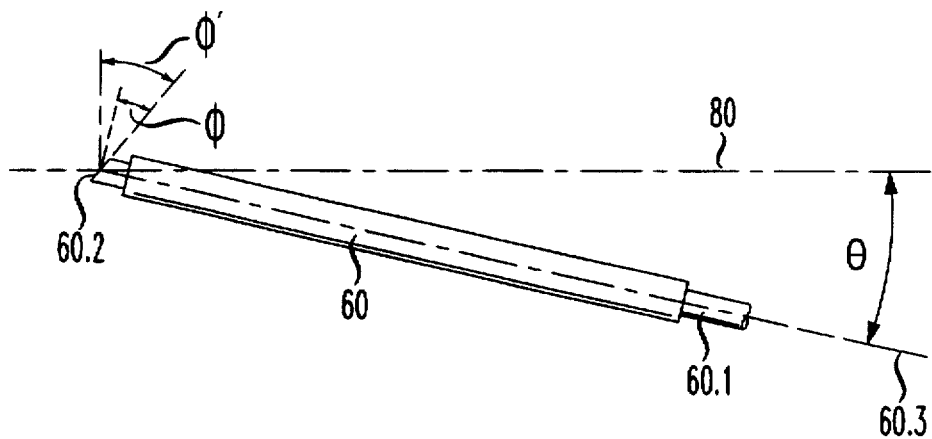
FIG. 2 is a schematic drawing showing how the optical fiber is beveled and tilted relative to the transmission axis.

The laser package, lens means, bore, splitter and the end face 60.2 (FIG. 2) of fiber 60 are aligned along transmission axis 80. Likewise, the photodetector package (i.e., lens 70.1) and the splitter are aligned along a transverse axis 90.

In accordance with one aspect of the invention, the central section 20.2 of housing 20 is provided with structural features that significantly reduce crosstalk; that is, reduce the amount of optical energy from the outgoing signal that reaches the photodiode in package 70. These structural features include a cavity 20.4 into which the outgoing signal reflected by splitter 50 is directed. To this end, the conical end portion 25.1 of bore 25 is optically coupled to cavity 20.4. Within the cavity an oblique surface 20.5 is positioned; that is, oblique surface 20.5 is disposed at an acute angle to transverse axis 90. Thus, most of the outgoing signal that enters the cavity is reflected off oblique surface 20.5 and is trapped within the cavity. Little escapes to have any significant chance of entering lens 70.1 of photodiode package 70.

In a preferred embodiment, the cavity 20.4 is formed in a cylindrical member 20.3 which fits into one end of central section 20.2 and which is aligned along transverse axis 90. Surface 20.5 is formed on the interior end of a plug 20.6 which is inserted into cavity 20.4 of member 20.3. In addition, end portion 25.1 of bore 25 is formed in member 20.3, and the beam splitter 50 is mounted on 45° surfaces 20.7 and 20.9 of member 20.3.

Although oblique surface 20.5 is depicted as being planar, it could be curved or take on more complex shapes. Moreover, surface 20.5 could be roughened or provided with a rough coating to decrease its light scattering properties. Or, it could be made of light-absorbing material or be provided with a light-absorbing coating.

Another aspect of the invention involves the orientation $\theta$ of fiber 60.1 relative to the transmission axis 80 and the orientation $\phi$ of end face 60.2 of the fiber relative to the normal to the same axis, and the orientation $\phi$ of the end face 60.2 relative to the normal to the fiber axis 60.3. More specifically, the end face 60.2 of the fiber may be beveled to further reduce reflections of the outgoing signal (i.e., from the fiber end face in this case), but this design may reduce coupling of the outgoing signal to the fiber. However, we have found that reduced reflections can be attained without significantly sacrificing coupling efficiency by tilting the beveled fiber 60 at a small angle $\theta$ relative to axis 80. In a preferred embodiment, $\phi \approx 2\theta$. For example, designs with the bevel angle $\phi \approx 8°$ and the tilt angle $\theta \approx 4°$ are suitable.

Yet another aspect of our invention which reduces crosstalk relates to the polarization orientation of the beam splitter 50. More specifically, this aspect of the invention contemplates that beam splitter 50 has its polarization direction oriented parallel to that of the outgoing signal (i.e., the light output of a typical laser diode is plane polarized). The polarization within a beam splitter is determined, as is well known in the art, by adjusting the thicknesses and compositions of the various layers of the multilayered structure of such a splitter. Of course, once that polarization direction within the splitter is known, then it is physically positioned relative to the laser diode to achieve the desired parallelism. In addition, coupling efficiency is improved by fabricating lens means 40 in the form of a single asphere lens. The curvature of the left hand surface of the asphere lens is designed to match the numerical aperture (NA) of the laser diode, whereas the curvature of the right hand surface is designed to match the NA of bore 25. Coupling efficiencies in excess of 70% have been realized with this design.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

We claim:

1. An optical transceiver assembly comprising a housing, mounted in the housing, a light source, a beam splitter, an optical fiber, a photodetector, and a lens for focusing an outgoing optical signal from said source through said splitter into said fiber, said splitter being positioned to reflect an incoming optical signal on said fiber to said photodetector, said splitter also reflecting a portion of said outgoing signal, said reflected portion being incident on surfaces within said housing, which surfaces further reflect said signal to said photodetector, CHARACTERIZED IN THAT said housing includes a cavity into which said reflected portion of said outgoing signal is directed by said splitter and an oblique surface disposed in said cavity so as to further reflect said portion in such a way as to reduce the amount thereof which reaches said photodetector, said source, lens, splitter and fiber are disposed along a first axis; said photodetector, splitter and cavity are disposed along a second axis transverse to said first axis; and said oblique surface makes an acute angle with said second axis, said housing includes a central section along said second axis, said photodetector is located at one end of said central section and a cylindrical member is located at the other end thereof, and said cylindrical member includes said cavity therein and a plug positioned in said cavity, said oblique surface being formed on the end of said plug disposed within said cavity.

2. The assembly of claim 1 further characterized in that said housing includes a bore which places said source in optical communication with said cavity, an end portion of said bore having a conical shape, and said splitter is mounted across said conical end portion and is oriented at about 45° to said first axis.

\* \* \* \* \*